Aug. 8, 1961   R. R. GUNDERSON   2,995,325
FOLDABLE HIGHWAY FLARE
Filed April 10, 1958   4 Sheets-Sheet 1
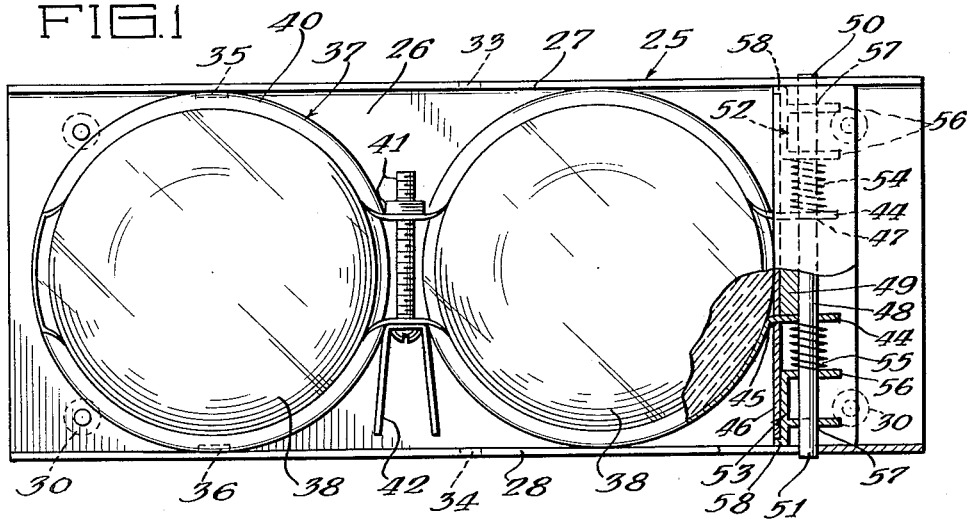
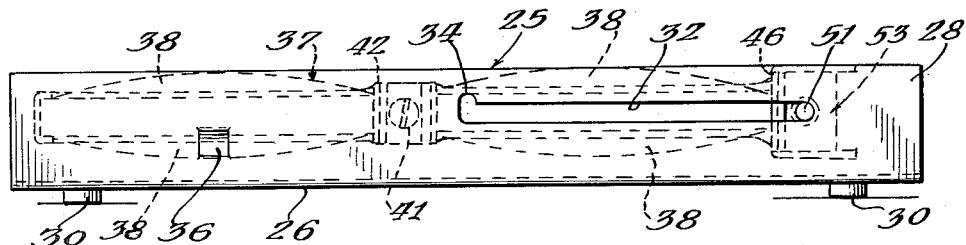
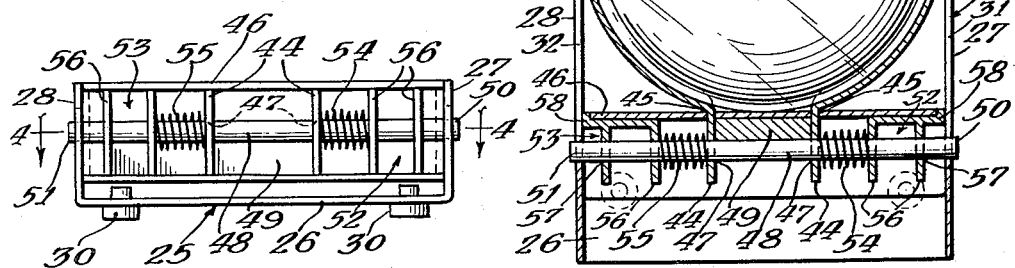
Inventor:
Ralph R. Gunderson
By: Schroeder, Hofgren,
Brady & Wegner
Attorneys Aug. 8, 1961 R. R. GUNDERSON 2,995,325
FOLDABLE HIGHWAY FLARE
Filed April 10, 1958 4 Sheets-Sheet 2
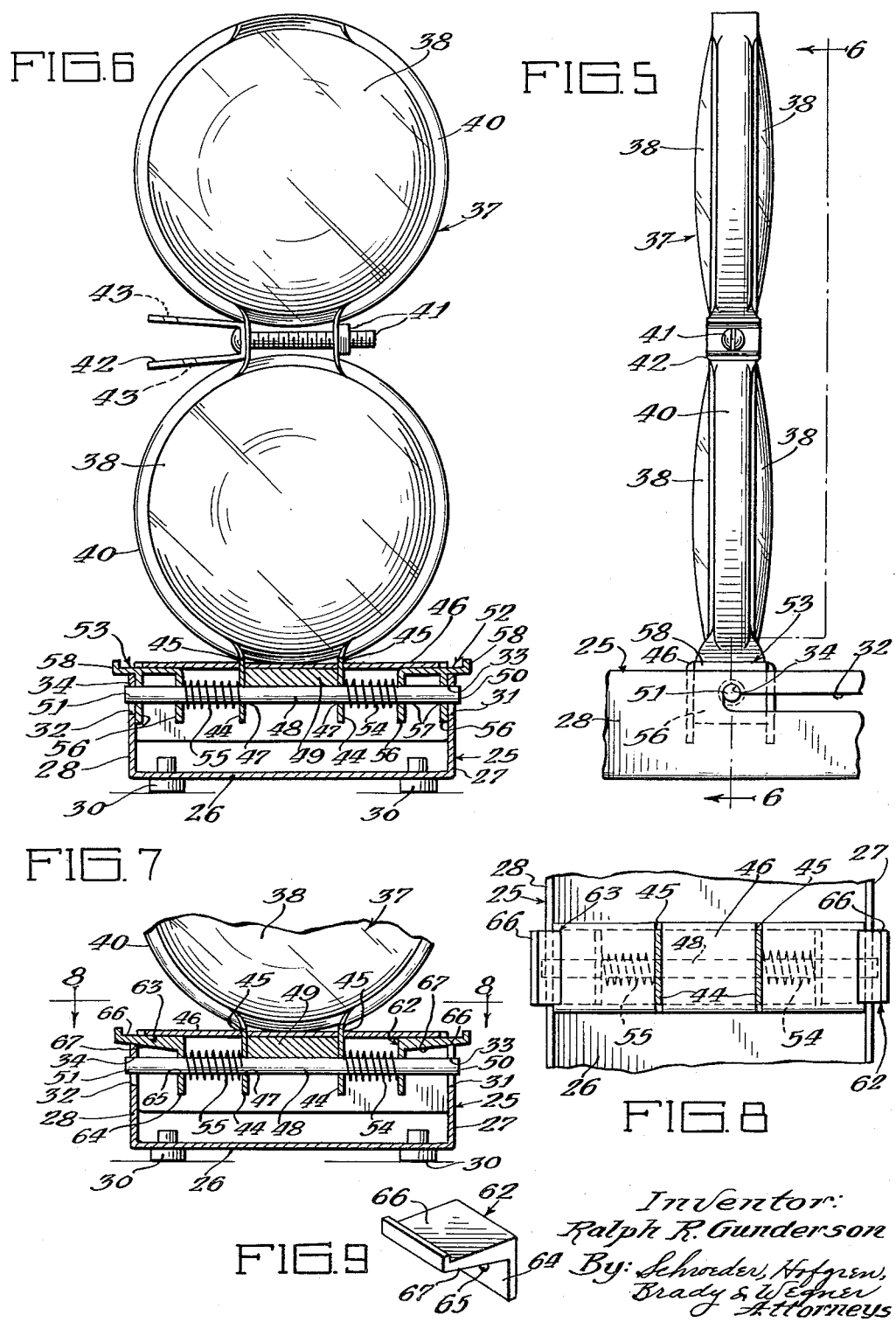
Inventor:
Ralph R. Gunderson
By: Schroeder, Hofgren,
Brady & Wegner
Attorneys Aug. 8, 1961 R. R. GUNDERSON 2,995,325
FOLDABLE HIGHWAY FLARE
Filed April 10, 1958 4 Sheets-Sheet 3
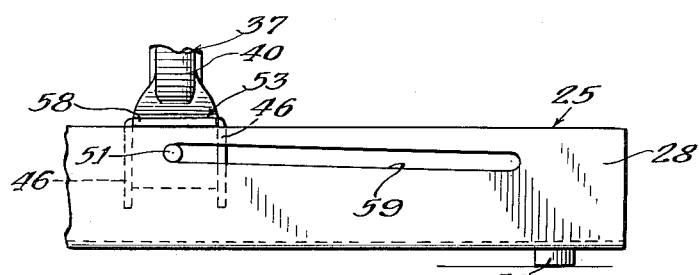
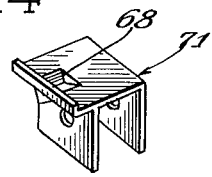
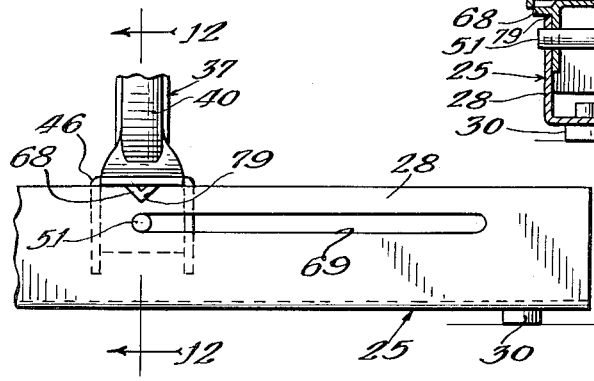
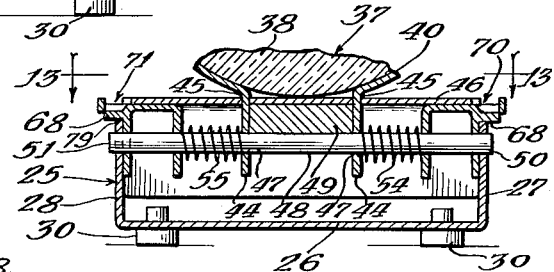
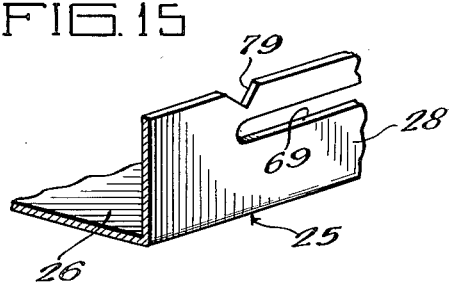
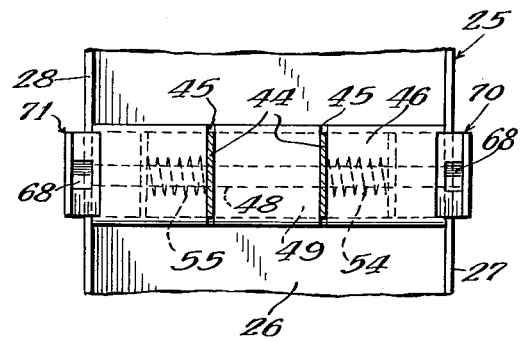
Inventor:
Ralph R. Gunderson
By: Schroeder, Hofgren,
Brady & Wegner
Attorneys

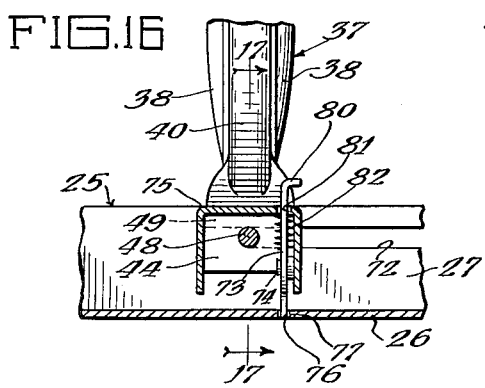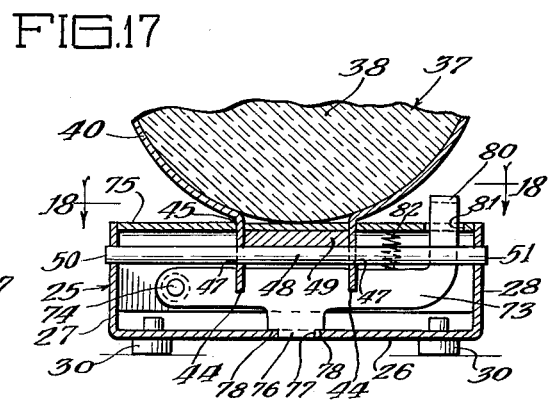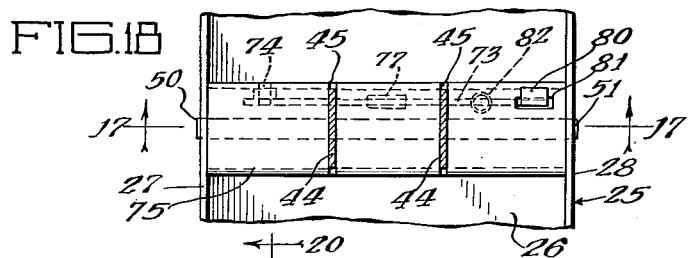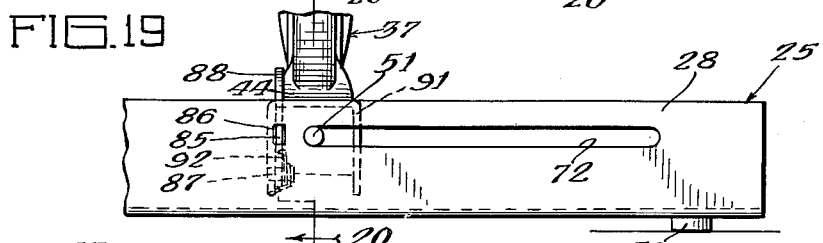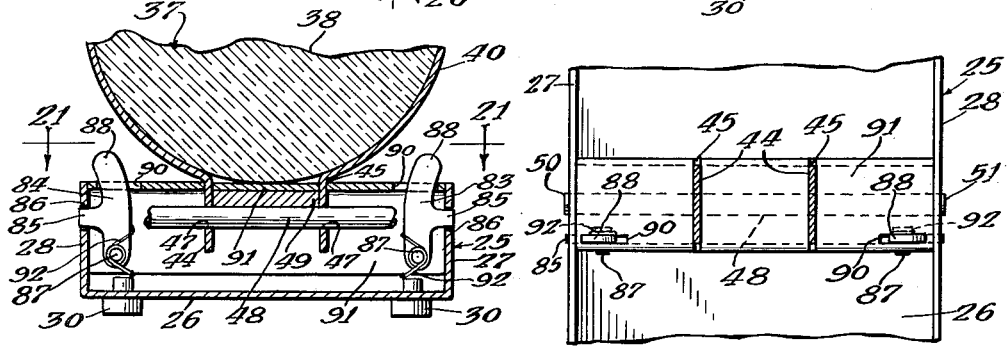

United States Patent Office 2,995,325
Patented Aug. 8, 1961

2,995,325
FOLDABLE HIGHWAY FLARE
Ralph R. Gunderson, 5520 South Shore Drive,
Chicago, Ill.
Filed Apr. 10, 1958, Ser. No. 727,715
9 Claims. (Cl. 248—33)

This invention relates to a foldable highway flare, and more particularly, to a releasable latching mechanism for maintaining the flare in upright operative position and permitting it to be swung into retracted closed position when not in use. The warning flare is commonly carried by trucks and other highway vehicles and is used during emergencies to warn approaching traffic of the existence of a dangerous highway condition.

The primary object of the present invention is to provide a new and improved foldable warning flare to be carried by highway vehicles.

Another object is to provide a releasable latching mechanism for such a highway flare which enables the flare to be held in upright open position and to be swung to closed position when not in use.

A further object is to provide such a latching mechanism which is automatically engageable when the flare is swung to upright open position.

Still another object is to provide a simple and durable highway flare which is particularly well adapted for manufacturing on a mass production basis.

The invention is illustrated in a preferred embodiment in the accompanying drawings, in which:

FIG. 1 is a top plan view of the highway flare in retracted closed position, the flare being partially broken away to show part of the latching mechanism;

FIG. 2, a side elevational view of the flare of FIG. 1 with the signaling device being shown in dotted outline;

FIG. 3, an end elevational view taken from the right of FIG. 1;

FIG. 4, a fragmentary sectional view taken as indicated on line 4—4 of FIG. 3;

FIG. 5, a fragmentary side elevational view, showing the highway flare in upright open position;

FIG. 6, a sectional view taken as indicated on line 6—6 of FIG. 5;

FIG. 7, a fragmentary view similar to FIG. 6, but showing a modified latching structure of the highway flare;

FIG. 8, a sectional view taken as indicated on line 8—8 of FIG. 7;

FIG. 9, a perspective view of one of the latching portions shown in FIG. 7;

FIG. 10, a fragmentary side elevational view of a second modification of the highway flare showing an upwardly inclined journal slide;

FIG. 11, a fragmentary side elevational view of a third modification of the highway flare showing still another form of latching mechanism;

FIG. 12, a sectional view taken as indicated on line 12—12 of FIG. 11;

FIG. 13, a fragmentary sectional view taken as indicated on line 13—13 of FIG. 12;

FIG. 14, a perspective view of a latching portion of the construction shown in FIG. 12;

FIG. 15, a fragmentary perspective view partially shown in section of a side wall of the supporting frame of a highway flare showing the notched cooperating latching portion of the frame;

FIG. 16, a fragmentary side elevational view partly in section of a fourth modification showing another form of latching structure;

FIG. 17, a sectional view taken as indicated on line 17—17 of FIG. 18;

FIG. 18, a fragmentary sectional view taken as indicated on line 18—18 of FIG. 17;

FIG. 19, a fragmentary side elevational view of a fifth modification showing still another form of latching structure;

FIG. 20, a sectional view taken as indicated on line 20—20 of FIG. 19; and

FIG. 21, a sectional view taken as indicated on line 21—21 of FIG. 20.

In the preferred embodiment illustrated in FIGS. 1 through 6, a supporting frame, generally designated 25, is preferably formed into channel shape from sheet metal to provide a base member 26 and a pair of opposed upright side walls 27 and 28, respectively. Each corner of the base member 26 may be apertured to snugly receive a rubber element 30 upon which the frame 25 is supported.

The side walls 27 and 28 are each provided with a similar journal slide preferably in the form of elongated slots 31 and 32 which extend rearwardly from the center of the frame 25. The slots may each have an upwardly offset journal seat 33 and 34 respectively, preferably located near the center of each side wall of the frame 25. Inwardly struck shoulders 35 and 36 may be provided in the forward end of the side walls 27 and 28, as shown in FIGS. 1 and 2, to afford a support for a signaling device, generally designated 37, when the device is in retracted closed position within the side walls 27 and 28 of the frame 25.

The signaling device 37 is of conventional construction and has two pairs of plastic reflecting lenses 38. The lenses of each pair are arranged back-to-back, and the sets are held in spaced relation by a continuous curved metal clamping strip 40 embracing portions of the periphery of each of the sets of lenses 38. The strip 40 is drawn together between the sets of lenses by a bolt and nut 41 which also anchors a U-shaped sheet metal bracket 42 to the signaling device 37. The bracket 42 is preferably apertured at 43 in each of its arms to receive the supporting stem of a signal flag, not shown.

The clamping strip 40 may have a pair of free end portions 44 each of which is snugly received within one of a pair of slots 45 in a transverse crossbar 46 to hold the lower end of the clamping strip 40 in embracing relationship about the lower set of lenses 38. As best seen in FIGS. 1 and 4, a spacer plate 49 is interposed between the crossbar 46 and a journal bar 48, and the free end portions 44 of the strip 40 are preferably apertured as at 47 to snugly receive and frictionally bear against the journal bar 48 passing therethrough. The journal bar 48 thus supports the crossbar 46 on the frame 25, and, in addition, anchors the clamping strip 40 and the sets of lenses 38 in position on the crossbar 46.

As best shown in FIGS. 2 and 5, the cross bar 46, preferably formed of sheet metal, is angularly bent so that it has a U-shaped configuration in section. The crossbar may be formed to extend across the base member 26 of the frame 25 between the side walls 27 and 28, and is of such length to permit the opposite journal bar ends 50 and 51 to protrude outwardly into the journal slides or slots 31 and 32. The legs of the U-shaped crossbar 46 are of such length that they remain spaced from the base member 26 of the frame 25 when the signaling device 37 is swung from retracted closed position (FIG. 2) to upright open position (FIG. 5).

In order to maintain the signaling device 37 in upright position, cooperating latching engagement is effected between portions of the frame 25 and an end of the signaling device 37. To this end, movable latching portions 52 and 53 are mounted on opposite ends of the journal bar 48 and normally urged outwardly of the crossbar 46 by a pair of coil springs 54 and 55 which embrace the journal bar 48 and bear between the latching portions and the free end portions 44 of the clamping strip 40. The spacer 49 braces the relatively thin end portions 44 against possible inward movement.

Since both of the latching portions of the first embodiment are alike, a description of one will suffice. The latching portion 52 is preferably provided with a pair of guide legs 56 each apertured at 57 to make a close sliding fit about an end of the journal bar 48. A latch bolt 58 joins the two guide legs 56 and has its upper face positioned closely adjacent the undersurface of the crossbar 46 to add stability to the latching mechanism. The outer guide leg 56 as shown in FIG. 6, abuts the adjacent side wall of the frame 25 when the latching portions are in engagement to limit their outward movement.

The manner in which latching is effected is best illustrated by FIGS. 4 and 6. In FIG. 4, the latching portions 52 and 53 are shown bearing outwardly under the compression of the coil springs 54 and 55 against the inner faces of the two side walls 27 and 28 when the signaling device 37 is in retracted closed position. As the signaling device is swung upwardly toward open position, and as the journal ends 50 and 51 are slid forwardly in the slots 31 and 32, the latch bolt 58 still bears against the inner faces of the side walls 27 and 28. However, when the signaling device reaches upright open position and the journal ends 50 and 51 are moved upwardly into the journal seats 33 and 34, the broad lower faces of the latch bolts 58 are projected outwardly over their cooperating latching portions on the frame, the upper edges of the side walls 27 and 28, by the coil springs 54 and 55. The projection of the latch bolts just above the side walls retains the journal ends 50 and 51 in the journal seats 33 and 34 so that the signaling device 37 is particularly stable when in upright operative position.

A modification of the invention is shown in FIGS. 7 through 9. This embodiment is generally similar to the preferred form, but the latching portions are slightly different. Accordingly, the description and numeral designations in all modifications will be limited to the new structure.

As best seen in FIGS. 7 and 9, movable latching portions, generally designated 62 and 63, are each provided with a guide leg 64 apertured at 65 and having a latch bolt 66 with a camming face 67. The latching portions 62 and 63 are slidably mounted on opposite ends 50 and 51 of the journal bar 48 by the apertured guide leg 64 in a manner somewhat similar to the preferred embodiment, and the upper face of each of the latch bolts 66 makes a close sliding fit with the underface of the crossbar 46 to form a stable latching assembly.

During latching of this embodiment, the free end of the latch bolts 66 are positioned and constructed so that when the signaling device 37 is turned to upright position with the journal ends 50 and 51 in the journal slides or slots 31 and 32 immediately below the journal seats 33 and 34, the latch bolt 66 will be projected outwardly so that the camming face 67 engages the top edge of each of the side walls 27 and 28 and forces the journal bar ends 50 and 51 upwardly into the journal seats 33 and 34. One of the advantages in utilizing the latching portions 62 and 63 is that each of them acts as a cam or wedge and pulls the journal bar ends 50 and 51 tightly into their respective journal seats 33 and 34 so that the highway flare is extremely stable and tightly latched in open position.

A second modification is illustrated in FIG. 10 and either or both of the latching portions of the first two embodiments can be utilized with this structure. In this modified form, the offset journal seats 33 and 34 of the first two embodiments need not be used. However, each of the side walls 27 and 28 is provided with a slightly different type of journal slide or slot 59 which is preferably angled slightly upwardly in a forward direction.

Thus, as the journal bar ends 50 and 51 are moved to the forward end of the slot 59 and the signaling device 37 is swung to open position, the movable latching portions 52 and 53 (or 62 and 63) are urged outwardly to a position above the edges of each of the side walls by their respective coil springs in a manner previously described. Since the slot 59 is angled downwardly in a rearward direction of the frame 25, and the broad faces of each of the latching portions 52 and 53 lie immediately above the edges of the side walls 27 and 28, the signaling device 37 is releasably locked in its upright open position and cannot move longitudinally or laterally of the frame.

A third modification of the invention is shown in FIGS. 11 through 15. In this form of the invention also, the journal seats 33 and 34 need not be used. It is preferred that each of the side walls 27 and 28 be provided with a horizontal journal slide or slot 69 to accommodate the journal bar ends 50 and 51. In addition, the upper edge of each of the side walls 27 and 28 may be provided with a notch 79, best shown in FIG. 15, which accommodates a downwardly struck detent 68 in each of a pair of latching portions 70 and 71.

The latching portions are best illustrated by the perspective view in FIG. 14 and can be seen to be quite similar (except for the detent 68) in structure and mounting to the latching portions 52 and 53 of the preferred embodiment. In order to latch the signaling device 37 in upright position, the journal bar ends 50 and 51 are moved in the journal slides 69 to a position beneath the notch 79, and the signaling device 37 is swung to open position to permit the latching portions 70 and 71 to be forced outwardly by the coil springs 54 and 55 to engage the detent 68 in the notch 79. The signaling device 37 is swung to retracted closed position in the same manner as with the three previous embodiments. The latching portions 70 and 71 are pushed inwardly beyond the inner faces of the side walls 27 and 28 and the signaling device 37 is swung downwardly between the side walls of the frame 25.

A fourth modification of the invention is shown in FIGS. 16 through 18. In this form, each of the side walls 27 and 28 preferably has a horizontal journal slide or slot 72 in which the journal bar ends 50 and 51 are positioned.

Latching engagement is effected by a latch bar 73 pivoted at 74 to an inner face of a U-shaped crossbar 75, as best seen in FIG. 17. The latch bar 73 is preferably provided with a projecting lug 76 of a size to snugly fit within an opening or recess 77 which is offset rearwardly of the journal axis in the base member 26 of the frame 25. The fore and aft marginal edge portions of the opening 77 serve as stop members to limit swinging movement of the signaling device 37 when latched in upright position. The projecting portion or lug 76 may have a pair of shoulders 78 to abut the base member 26 about the periphery of the opening 77 and limit downward movement of the latch bar when in latching engagement.

A finger portion 80 is provided on the free end of the latch bar 73 and projects outwardly through an aperture 81 in the crossbar 75. When the signaling device 37 is in upright open position (FIG. 17), a coil spring 82 which bears between the crossbar 75 and the latch bar 73 normally urges the latch bar toward locking position. An out-turned part on the finger portion 80 prevents the finger portion from passing through the aperture 81 when the signaling device is in retracted closed position.

In order to latch the signaling device 37 in open position, the journal ends 50 and 51 are pulled forwardly to the end of the slot 72 and the signaling device 37 is rotated clockwise until the projecting portion 76 of the latch bar 73 snaps into the opening 77 in the base member 26 of the frame 25. To return the signaling device to retracted closed position, the finger portion 80 is lifted to remove the projecting portion 76 from the opening 77, and the signaling device 37 is swung counterclockwise to a position within the frame 25.

A fifth modification of the invention is illustrated in FIGS. 19 through 21, and its operation is quite similar to the fourth modification described above. In this form of the invention, a pair of latching portions 83 and 84 are each provided with a projecting lug 85 which is adapted to fit in an opening 86 formed in each of the side walls 27 and 28. The latching portions 83 and 84 are pivoted at 87 and each has a projecting finger portion 88 extending through a slot 90 in a crossbar 91. The latching portions 83 and 84 are normally urged outwardly against the inner faces of the side walls 27 and 28 by coil springs 92 at the point of pivot.

In operation, when the journal bar ends 50 and 51 are moved to the forward end of the slot 72 and the signaling device 37 is swung to upright open position, each of the latching portions automatically snaps into its opening 86 in each of the side walls 27 and 28 to hold the signaling device uprightly. The finger portions 88 permit the projecting lugs 85 to be removed from the openings 86 so that the signaling device 37 can be unlatched and swung downwardly into the frame as previously described.

The foregoing detailed description is given for clearness of understanding only and no unnecessary limitations should be understood therefrom, for some modifications will be obvious to those skilled in the art.

I claim:

1. A foldable highway flare, comprising: a supporting frame having a pair of upright opposed side walls, each of said side walls being provided with a similar journal slot extending longitudinally of said frame; a signaling device provided at one end with a transverse crossbar and a pair of oppositely projecting journals, each of said journals being slidably received in one of said journal slots to afford swinging movement of said signaling device between retracted closed position and upright open position; and a spring-urged latching portion mounted on said crossbar for movement outwardly of the frame, said latching portion being positioned to slide outwardly over the upper edge of one of the side walls when the signaling device is swung to upright open position to retain the signaling device in said upright open position.

2. A foldable highway flare, comprising: a supporting frame having a pair of upright opposed side walls, each of said side walls being provided with a similar journal slot extending longitudinally of said frame and having an upwardly offset journal seat; a signaling device provided at one end with a transverse crossbar and a transverse journal bar, said journal bar having its opposite ends slidably received in one of said journal slots and of a size to fit in said journal seats to afford swinging movement of said signaling device between retracted closed position and upright open position; a compression spring embracing each end portion of the journal bar; and a bolt latch slidably mounted on each end of said journal bar and each bearing at its inner end against one of the compression springs so as normally to be urged outwardly of the frame, each of said bolt latches being positioned relative to the top edge of an adjacent side wall so that each of said bolt latches will move outwardly over the top edge of the adjacent side wall when the journal ends are positioned in the journal seats and the signaling device is swung to upright open position.

3. A foldable highway flare, comprising: a supporting frame having a pair of upright opposed side walls, each of said side walls being provided with a similar journal slide extending longitudinally of said frame; a signaling device provided at one end with a pair of oppositely projecting journals, each of said journals being slidably received in one of said journal slides to afford swinging movement of said signaling device from retracted closed position forwardly to upright open position; and a first latching portion mounted on said one end of the signaling device, said latching portion being spring-urged toward the frame, said frame having a cooperating latching portion positioned to engage said first latching portion when said signaling device is in upright open position, whereby swinging movement of the signaling device from retracted closed position forwardly to upright open position enables said first latching portion to engage said cooperating latching portion on the frame to retain the signaling device in upright open position.

4. A foldable highway flare as specified in claim 3 in which each of said journal slides is provided with an offset journal seat to snugly receive the journals when the signaling device is swung to upright open position with the latching portions in engagement whereby the snug fit of the journals in the offset journal seats and the engaged latching portions impart stability to the signaling device in upright open position.

5. A foldable highway flare as specified in claim 3 in which the spring urged first latching portion normally bears outwardly against the frame and is held in unlatching position as the signaling device is swung from retracted closed position toward upright open position, said first latching portion being moved into latching engagement with the cooperating latching portion on the frame when the signaling device is moved into upright open position.

6. A foldable highway flare as specified in claim 3 in which each of the journal slides extends forwardly of the frame at an inclined angle to afford a pair of journal seats for the journals at the forward ends of the journal slides, said journal seats being positioned with respect to the latching portions so that the latching portions are in position to effect latching engagement when the signaling device is swung forwardly to upright open position with the journals in said journal seats.

7. A foldable highway flare, comprising: a supporting frame having a pair of upright opposed side walls, each of said side walls being provided with a longitudinally extending journal slide having an offset journal seat; a signaling device provided at one end with a pair of oppositely projecting journals of a size to be received in said offset journal seats, each of said journals being slidably received in one of said journal slides to afford swinging movement of said signaling device between retracted closed position and upright open position; and a first latching portion mounted on said one end of the signaling device and being movable toward the supporting frame, said frame having a cooperating latching portion positioned to engage said first latching portion when said signaling device is swung to upright open position and each journal is positioned in its respective journal seat, the engagement of said latching portions retaining the signaling device in upright open position.

8. A foldable highway flare as specified in claim 7 in which the first latching portion is slidable axially of the journal and is spring-urged toward the cooperating latching portion on the frame, said latching portions being positioned so that swinging of the signaling device to upright open position and movement of the journals into their respective journal seats will aline said latching portions so that said first latching portion will be spring-urged into engagement with said cooperating latching portion to hold the signaling device in upright open position.

9. A foldable highway flare as specified in claim 7 in which the first latching portion is slidable axially of the journals and is normally urged toward the cooperating latching portion on the frame, said first latching portion being provided with a camming surface engageable with said cooperating latching portion, said latching portions being positioned so that swinging of the signaling device to upright open position alines said latching portions so that said camming surface is projected into engagement with the one latching portion and forces each journal into its respective journal seat to hold the signaling device in upright open position.

References Cited in the file of this patent

UNITED STATES PATENTS

| | | |
|---|---|---|
| 2,235,282 | Carver | Mar. 18, 1941 |
| 2,261,688 | Luce et al. | Nov. 4, 1941 |
| 2,520,389 | Ferries | Aug. 29, 1950 |
| 2,536,177 | Harkins | Jan. 2, 1951 |
| 2,679,370 | Bolser | May 25, 1954 |

FOREIGN PATENTS

| | | |
|---|---|---|
| 146,831 | Australia | June 12, 1952 |